United States Patent
Pare, Jr. et al.

(10) Patent No.: US 8,687,717 B2
(45) Date of Patent: Apr. 1, 2014

(54) METHOD AND APPARATUS FOR CLOSED LOOP BEAMFORMING IN WIRELESS COMMUNICATION SYSTEMS

(75) Inventors: Thomas Edward Pare, Jr., Mountain View, CA (US); John Wong, San Jose, CA (US)

(73) Assignee: Mediatek Inc., Hsin-Chu (TW)

(*) Notice: Subject to any disclaimer, the term of this patent is extended or adjusted under 35 U.S.C. 154(b) by 520 days.

(21) Appl. No.: 12/500,154

(22) Filed: Jul. 9, 2009

(65) Prior Publication Data

US 2010/0172425 A1 Jul. 8, 2010

Related U.S. Application Data

(60) Provisional application No. 61/142,867, filed on Jan. 6, 2009.

(51) Int. Cl.
*H04L 27/28* (2006.01)

(52) U.S. Cl.
USPC ............ 375/260; 375/219; 375/267; 375/285

(58) Field of Classification Search
USPC .......................... 375/260, 267, 229–233, 285
See application file for complete search history.

(56) References Cited

U.S. PATENT DOCUMENTS

| | | | |
|---|---|---|---|
| 2006/0098580 A1* | 5/2006 | Li et al. | 370/245 |
| 2006/0209712 A1* | 9/2006 | Morioka et al. | 370/252 |
| 2007/0147535 A1* | 6/2007 | Niu et al. | 375/267 |
| 2007/0195974 A1* | 8/2007 | Li et al. | 381/94.3 |
| 2007/0223422 A1* | 9/2007 | Kim et al. | 370/334 |

FOREIGN PATENT DOCUMENTS

WO  WO 2007114804 A1 * 10/2007

* cited by examiner

*Primary Examiner* — Sam K Ahn
*Assistant Examiner* — Janice Tieu
(74) *Attorney, Agent, or Firm* — Sawyer Law Group, P.C.

(57) ABSTRACT

Varying embodiments of the present invention describe a closed loop system for processing the beamforming information, qualifying the expected performance, activating and deactivating the beamforming system. A first embodiment is a method for closed loop beamforming in a wireless communication system, the system comprising a transmitter and a receiver, the method comprising initiating beamforming on a communication channel between the transmitter and the receiver, monitoring the communication channel, periodically determining a condition of the communication channel and controlling beamforming based on the condition of the communication channel.

9 Claims, 4 Drawing Sheets

METHOD AND APPARATUS FOR CLOSED LOOP BEAMFORMING IN WIRELESS COMMUNICATION SYSTEMS

RELATED APPLICATION

This application claims the benefit of U.S. Provisional Patent Application No. 61/142,867, filed Jan. 6, 2009.

FIELD OF THE INVENTION

The present invention relates generally to wireless communication systems and more specifically to closed loop beamforming for wireless communication systems.

BACKGROUND

Beamforming is a method for using wireless channel information to transmit signals to the receiver in order to improve reception quality, and increase data throughput in a Multi-In, Multi-Out (MIMO) communication system. This requires that the channel sounding packets be processed at the receiver and the beamforming information be retransmitted back to the transmitter in a closed loop fashion. The remaining issue for closed loop beamforming is system stability. In general, the beamforming parameters are very straightforward to compute for a given channel condition. However, the wireless channel between the transmitter and receiver is constantly changing, due to changes in the environment, which cause fluctuation in the Signal-to-Noise Ration (SNR) and varying multipath conditions. Therefore, a certain set of beamforming parameters may not apply to the current channel, and be considered "stale". If a closed loop system does not anticipate the changing channel conditions, and does not qualify beamforming sets, the throughput can degrade, and the link can become unstable.

It is unclear how the problem of "channel tracking" is currently solved. Most systems in the literature assume the channel is not changing, and that the beamforming parameters for the particular channel are known at the transmitter. This invention specifically addresses the closed loop beamforming issue of changing channel conditions.

Varying embodiments of the present invention describe a closed loop system for processing the beamforming information, qualifying the expected performance, activating and deactivating the beamforming system. The invention utilizes well-defined metrics to indicate a change in the channel state, and apply a new sounding packet in order to update the beamforming parameters. Using periodic soundings, changing channel conditions are thus automatically detected and compensated. The advantage is that the link stability is improved, and high throughput with active beamforming is maintained.

A first embodiment is a method for closed loop beamforming in a wireless communication system, the system comprising a transmitter and a receiver, the method comprising initiating beamforming on a communication channel between the transmitter and the receiver, monitoring the communication channel, periodically determining a condition of the communication channel and controlling beamforming based on the condition of the communication channel.

A second embodiment is a wireless communication system comprising a transmitter, a receiver, a communication channel for communication there between wherein the transmitter and receiver each include at least one software module capable of performing the following steps initiating beamforming on the communication channel between the transmitter and the receiver, monitoring the communication channel, periodically determining a condition of the communication channel and controlling beamforming based on the condition of the communication channel.

Other aspects and advantages of the present invention will become apparent from the following detailed description, taken in conjunction with the accompanying drawings, illustrating by way of example the principles of the invention.

BRIEF DESCRIPTION OF DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF PREFERRED EMBODIMENTS

The present disclosure relates to a method and system for closed loop beamforming for MIMO OFDM wireless communication systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In varying embodiments, a method and system for closed loop beamforming for MIMO OFDM wireless communication systems is disclosed. Well-defined metrics are utilized to indicate a change in the channel state, and apply a new sounding packet in order to update the beamforming parameters. Using periodic soundings, changing channel conditions are thus automatically detected and compensated. The advantage is that the link stability is improved, and high throughput with active beamforming is maintained.

The system in accordance with the present invention can take the form of an entirely hardware implementation, an entirely software implementation, or an implementation containing both hardware and software elements. In one implementation, this detection procedure is implemented in software, which includes, but is not limited to, application software, firmware, resident software, microcode, etc.

Furthermore, the method can be implemented in the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk—read/write (CD-R/W). To describe the features of the present invention in more detail, refer now to the following description in conjunction with the accompanying Figures.

Figure 1:
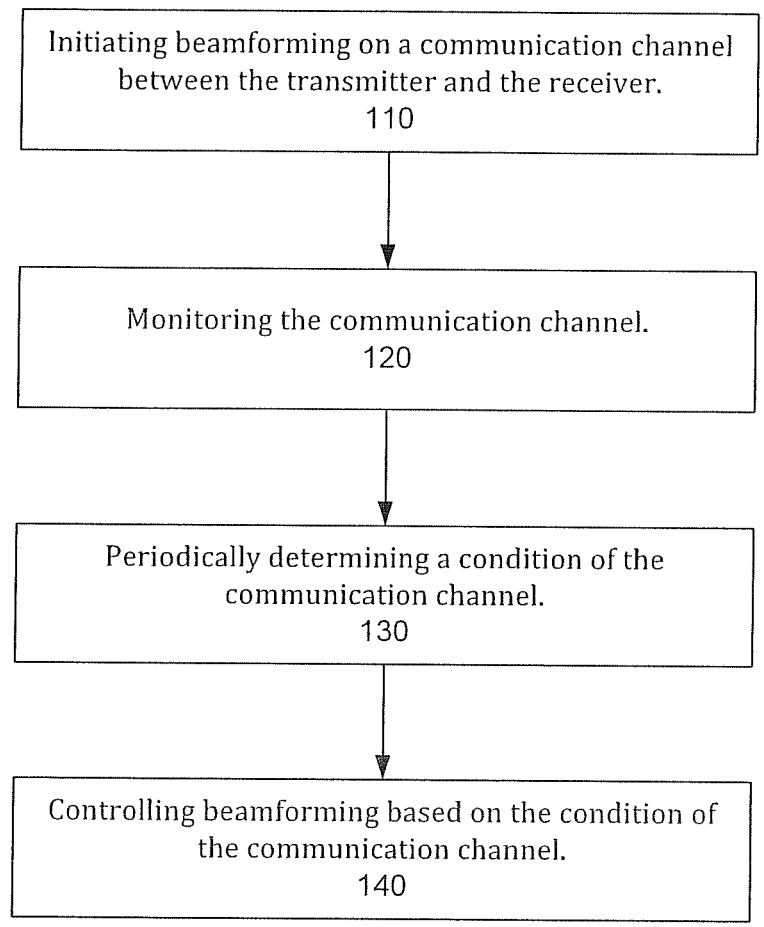
FIG. 1 shows a flowchart of a method in accordance with an embodiment of the present invention.

FIG. 1 shows a flowchart of a method in accordance with an embodiment of the present invention. Step 110 involves initiating beamforming on a communication channel between the transmitter and the receiver. A second step 120 involves monitoring the communication channel. A third step 130 involves periodically determining a condition of the communication channel. A final step 140 includes controlling beamforming based on the condition of the communication channel.

Figure 2:
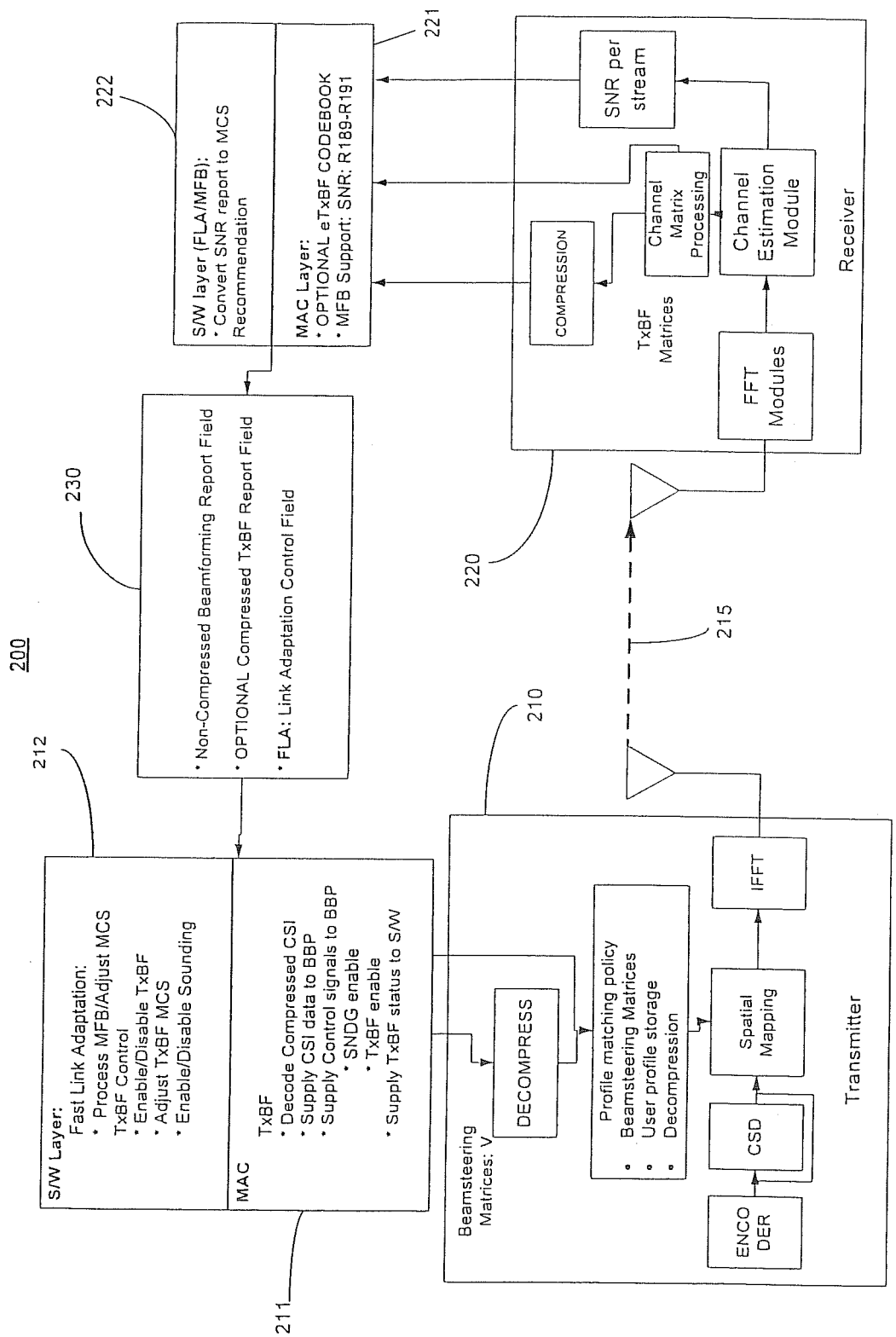
FIG. 2 shows a system in accordance with an embodiment of the present invention.

FIG. 2 shows a system 200 in accordance with an embodiment of the present invention. The system 200 includes a transmitter 210 and a receiver 220 capable of communicated via a communication channel 215. Additionally, the transmitter 210 and the receiver 220 include respective software (S/W) layers and Media Access Control (MAC) layers. The feedback signals 230 are depicted in the upper middle block.

In an embodiment, the system 200 includes features compliant with the 802.11nD4.0 standard to improve the performance of MIMO transmission. Two features described here are fast link adaptation (FLA), and explicit transmit beamforming (eTxBF). The FLA mechanism is intended to improve system throughput and robustness by providing a protocol for CSI at the receiver 220 to assist the transmitter 210 in selecting an ideal Modulation and Coding Scheme (MCS) under the present channel conditions. The feedback mechanism is an MCS recommendation, or MCS feedback (MFB).

The eTxBF mechanism is intended to improve MIMO performance by transmitting multi-stream data packets using beamforming, or beamsteering matrices for each subcarrier that will maximize the received signal strength, and assist in the subsequent equalization at the receiver 220.

Fast Link Adaptation

Fast Link Adaptation (FLA) is implemented across both the transmitter 210 and the receiver 220. FLA is a process where link quality is measured and used to predict instantaneous link performance. The highest Modulation and Coding Scheme (MCS) is selected based on predicted link performance for the transmission. For example, on the receive side, for a packet with a non-sounding packet (unsolicited match-field beamforming (MFB)), upon receiving a MIMO packet, the receiver will compute an estimated SNR per spatial stream. This will be reported to the MAC layer 221, which will pass this information to the receiver software layer 212. The software will convert this SNR information into an MCS recommendation, and send it back to the transmitter 210. At the transmitter side, the software shall monitor the recommendations and adjust the MCS of the transmitted packets accordingly.

Explicit Tx Beamforming

For explicit beamforming, the receiver 220, or beamformee, computes the beamsteering matrix V and sends it back to the transmitter 210, or beamformer. The receiver 220 will compute both uncompressed and compressed versions of the beamforming matrix, for each subcarrier. The MAC 211 will decode the sounding packet and determine which format the particular beamformer supports, and send the proper format in the training response packet. In addition to the beamforming matrices, the transmission will include a corresponding SNR that will predict the signal quality of the subsequent beamformed packets.

When the beamformer receives the response, the software 212 will monitor the SNR levels to determine whether or not the training response should be used to update, or replace, the current beamforming parameters. Changing channel conditions will cause the MFB to degrade for the active beamforming parameters, and thus trigger an update, or sounding request for a new set of beamforming matrices.

Figure 3:
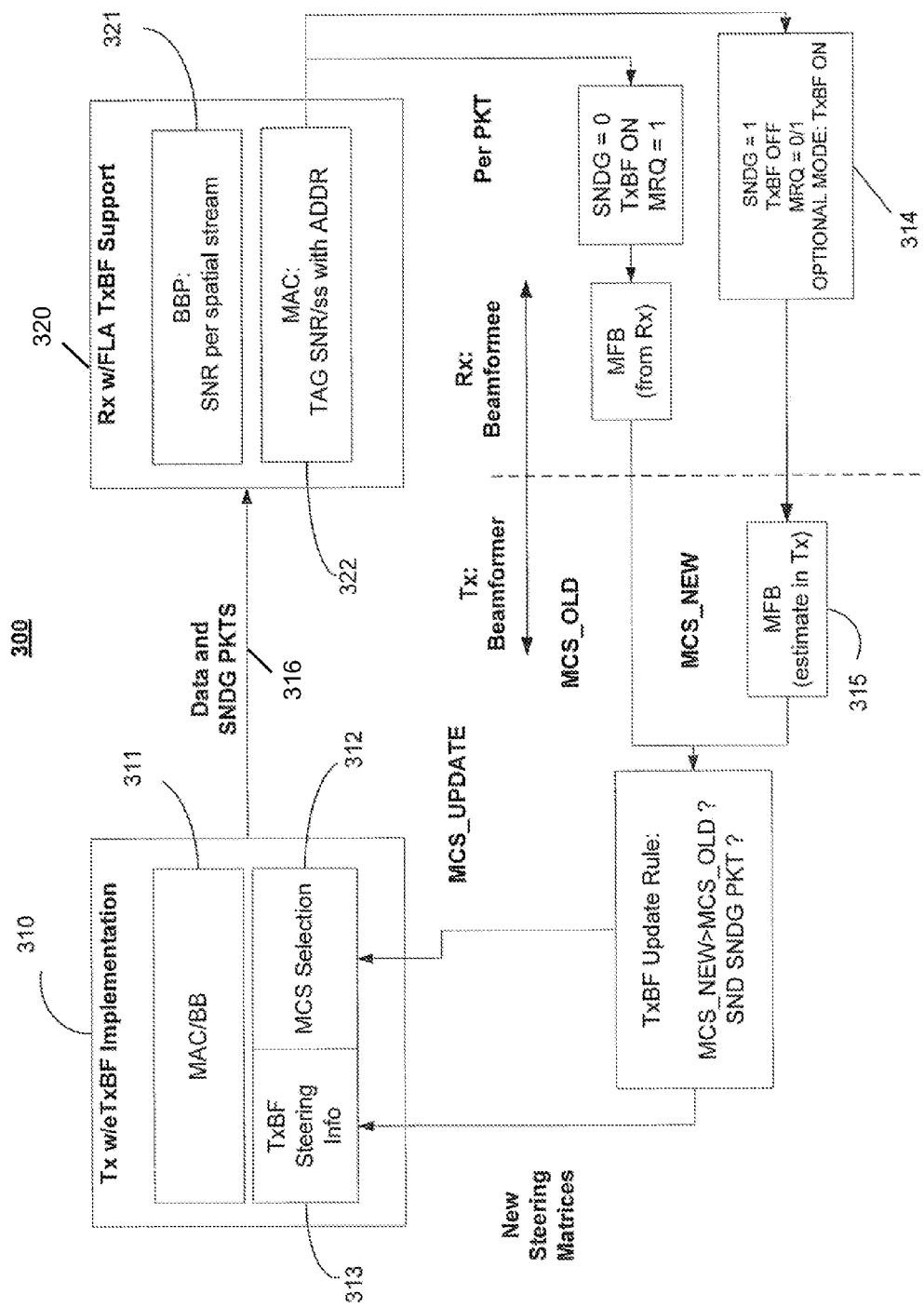
FIG. 3 shows an explicit transmission feedback system in accordance with an embodiment of the present invention.

An explicit transmission feedback system 300 is shown in FIG. 3. The system 300 includes a transmitter 310 and a receiver 320 and a communication channel 316 there between. The transmitter 310 includes a MAC and baseband processor (MAC/BBP) module 311, an MCS Selection module 312 and a transmission Beamforming (TxBF) Steering Info module 313. The receiver also includes a baseband processor (BBP) module 321 and a MAC module 322. Also shown is the sounding response computation module 314 and the MFB estimator 315. The MAC/BB module 311 prepares packets for transmission by selecting the latest MCS value for the packet recipient from the MCS Selection module 312. Then, prior to forming the transmit output, the MAC/BB module 311 retrieves the beamsteering matrices for the particular recipient from the TxBF Steering Info module 313. If the corresponding user entry in module 313 contains a valid beamsteering set, then the outgoing beamforming processing is performed.

TxBF control will work in parallel with the link adaptation, which utilizes MFB signals to control the modulation (data rate) of the current communication link. In this system 300, the transmitter 310 will monitor the current status of the data link by issuing periodic MHQ packets. In addition, to activate beamforming, sounding packets (SNDG=1) will be sent periodically, at a lower rate than the MFB requests. The transmitter 310 software modules will process the SNR values in the MIMO sounding response, and convert this to an equivalent MCS value that corresponds to the set of associated beamsteering matrices.

When the beamsteering MCS computed is detected to be higher than current MFB value, the TxBF shall be activated, loading the beamsteering matrices into the baseband and the new MCS shall be used. The MFB (from the RX, MRQ=1) will subsequently monitor the status beamforming matrices, and the sounding packets will be sent un-beamformed (TxBF OFF) to further detect the need for an update for the TxBF steering matrices.

The loaded beamforming matrices may be from a sounding packet sent after the MCS change was detected. In this case, the MFB from the subsequent sounding shall be qualified to guarantee that the new MCS still triggers, or satisfies, the rate change criteria.

Figure 4:
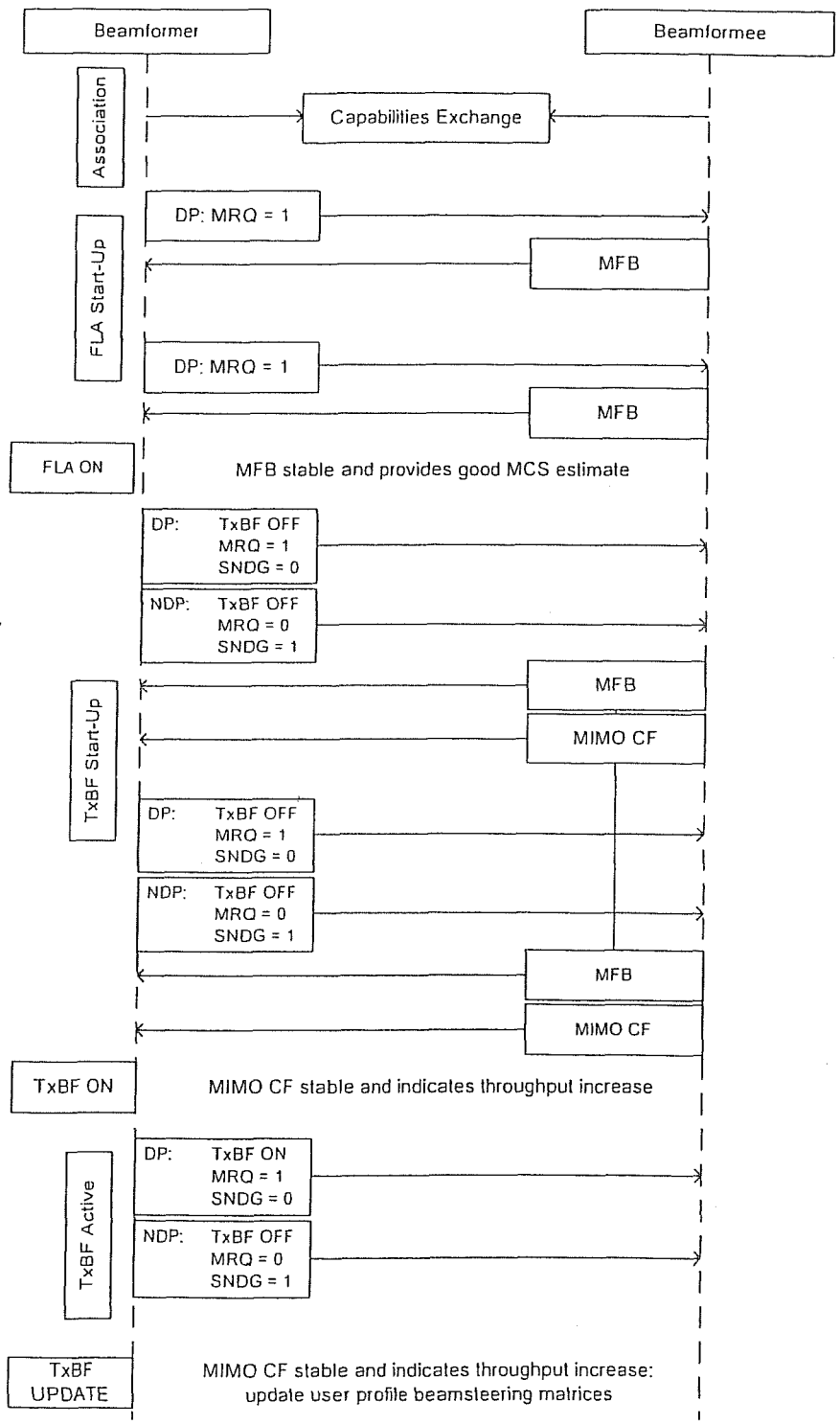
FIG. 4 shows a timeline of the operation of the system in accordance with an embodiment of the present invention.

The closed loop TxBF/MFB operation can be further detailed using a timeline, as shown in FIG. 4. Starting from the top of the timeline, the beamformer and beamformee establish a link through association, and make a capabilities exchange. At this point, the beamformer (on the left) is aware that the associated client is supports MFB/MRQ, and commences MFB requests (MRQ), and the beginning of FLA Startup, as shown in FIG. 2. During FLA Startup, the current/existing rate adaptation algorithm shall control the rate adaptation.

After establishing a stable MFB response, and finding that the MFB indicates a higher throughput than the current MCS selection (based on the existing rate adaptation), then the rate adaptation shall switch over to use the MFB, and thus enable the fast link adaptation (FLA ON). A stable MFB can be determined, as an example, by monitoring the statistical mean and variance of the MCS values being returned. If the mean and variance are within some pre-set bounds, then the MFB link can be assumed to be sufficiently stable for closed-loop FLA operation.

During FLA active period, the beamformer issues both MRQ and sounding packets. The MRQ=1 data packets keep the MFB feedback current, while the NDP sounding packets probe the channel to identify good TxBF opportunities. The beamformer uses the MIMO control frame SNR information to determine the equivalent MCS (or SNDG_MCS). When the SNDG_MCS is found to be stable, and correspond to a higher throughput than the current MFB control variable, the beamformer then may activate the beamforming, by enabling the MAC/BB 311 to load the beamsteering matrices into the TxBF Steering Info module 313 and begin beamforming using the associated MCS value from the MCS selection module 312. Then, TxBF is enabled, or active.

Following the detection of a qualifying SNDG_MCS, the software may issue another MRQ DP/SNDG NDP, and use the beamforming matrices from the subsequent response in order to initiate a TxBF profile update.

While the TAW is active, subsequent DP-MRQ packets will have TxBF active, and the subsequent MFB will monitor the status of the TxBF link. The corresponding NDP-SNDG packets will have TxBF not active, and will provide the SNDG_MCS values. These SNDG_MCS values will be used to update the TxBF profile, in a mariner identical to the initial activation of the TxBF mode.

Referring back to FIG. 3, an alternate embodiment is now considered. In the above description, the closed loop beamforming operation is accomplished using parallel MFB, and sounding packet responses. The quality of the beamforming operation is assessed by monitoring the MFB of the beamformed packet, while the typically lower rate sounding packets were sent unbeamformed. In an alternate configuration, the control can be accomplished without utilizing MFB, and the periodic sounding can include beamformed sounding packets. In this case, the sounding responses are computed in element 314. Correspondingly, the MFB equivalent estimate is computed in element 315 using both the beamformed and non-beamformed response metrics. The advantage of this implementation is that the MFB comparison is done in a central location (at the transmitter 310), so the metrics can be computed with the same algorithm. Whereas, in the previous method described, MFB computed at the receiver 320 may use a different algorithm resulting in inconsistent recommendations. In addition, this optional approach has the advantage of separating the MFB function from the beamforming response, so that beamforming can be effectively implemented in systems where the receiver does not support MFB.

In varying embodiments, a method and system for closed loop beamforming for MIMO OFDM wireless communication systems is disclosed. Well-defined metrics are utilized to indicate a change in the channel state, and apply a new sounding packet in order to update the beamforming parameters. Using periodic soundings, changing channel conditions are thus automatically detected and compensated. The advantage is that the link stability is improved, and high throughput with active beamforming is maintained.

Without further analysis, the foregoing so fully reveals the intent of the present inventive concepts that others can, by applying current knowledge, readily adapt it for various applications without omitting features that, from the standpoint of prior art, fairly constitute essential characteristics of the generic or specific aspects of this invention. Therefore, such applications should and are intended to be comprehended within the meaning and range of equivalents of the following claims. Although these inventive concepts have been described in terms of certain embodiments, other embodiments that are apparent to those of ordinary skill in the art are also within the scope of this invention, as defined in the claims that follow.

What is claimed is:

1. A method for closed loop beamforming in a wireless communication system, the system comprising a transmitter and a receiver, the method comprising:
    initiating beamforming on a communication channel between the transmitter and the receiver;
    monitoring the communication channel;
    periodically determining a condition of the communication channel; wherein the periodically determining the condition of the communication channel includes implementing a fast link adaption methodology, wherein link quality is measured and used to predict instantaneous link performance and wherein multi-stream data packets are transmitted using beamformed matrices for each subcarrier that will maximize a received signal and will assist in the subsequent equalization at the receiver, wherein the transmission includes a corresponding signal to noise ratio (SNR) that will predict the signal quality of subsequent beamformed packets, wherein the periodically determining the condition of the channel further comprises sounding the communication channel; and
    controlling the beamforming based on the condition of the communication channel, wherein controlling beamforming further comprises:
    deactivating the beamforming if a first condition is met;
    re-sounding the communication channel;
    updating the beamformed matrices; and
    activating the beamforming according to the updated beamformed matrices; and
    wherein the communication channel comprises an modulation and coding scheme (MCS) value and MCS feedback and the first condition comprises is where the MCS value is higher than the MCS feedback.

2. The method of claim 1 wherein monitoring the communication channel further comprises:
    issuing periodic Modulation/Coding Scheme requests (MRQ) packets.

3. The method of claim 1 wherein the condition of the channel is based on at least one beamsteering matrix.

4. A wireless communication system comprising:
    a transmitter;
    a receiver;
    a communication channel for communication therebetween wherein the transmitter and receiver each is configured to steps:
    initiate beamforming on the communication channel between the transmitter and the receiver;
    monitor the communication channel;
    periodically determine a condition of the communication channel; wherein the periodically determine the condition of the communication channel includes implementing a fast link adaption methodology, wherein link quality is measured and used to predict instantaneous link performance and wherein multi-stream data packets are transmitted using beamformed matrices for each subcarrier that will maximize a received signal and will assist in the subsequent equalization at the receiver, wherein the transmission includes a corresponding signal to noise ratio (SNR) that will predict the signal quality of subsequent beamformed packets, wherein the periodically determine the condition of the channel further comprises sound the communication channel; and control the beamforming based on the condition of the communication channel, wherein control the beamforming further comprises:

deactivate the beamforming if a first condition is met;

re-sound the communication channel;

update the beamformed matrices; and activate the beamforming according to the updated beamformed matrices; and wherein the communication channel comprises an modulation and coding scheme (MCS) value and MCS feedback and the first condition comprises is where the MCS value is higher than the MCS feedback.

5. The system of claim 4 wherein monitor the communication channel further comprises:

issue periodic Modulation/Coding Scheme requests (MRQ) packets.

6. The system of claim 4 wherein the condition of the channel is based on at least one beamsteering matrix.

7. A non-transitory computer program product tangibly embodied on a non-transitory computer usable medium for controlling user access to stored data elements, the non-transitory computer program product having computer readable program means for causing a computer to:

initiate beamforming on a communication channel between the transmitter and the receiver;

monitor the communication channel;

periodically determining a condition of the communication; wherein the periodically determine the condition of the communication channel includes implementing a fast link adaption methodology, wherein link quality is measured and used to predict instantaneous link performance and wherein multi-stream data packets are transmitted using beamformed matrices for each subcarrier that will maximize a received signal and will assist in the subsequent equalization at the receiver, wherein the transmission includes a corresponding signal to noise ratio (SNR) that will predict the signal quality of subsequent beamformed packets, wherein the periodically determine the condition of the channel further comprises sound the communication channel; and control the beamforming based on the condition of the communication channel, wherein the control beamforming further comprises:

deactivate the beamforming if a first condition is met;

re-sound the communication channel;

update the beamformed matrices; and activate the beamforming according to the updated beamformed matrices; and wherein the communication channel comprises an modulation and coding scheme (MCS) value and an matchfield beamforming (MFB) value and the first condition comprises is where the MCS value is higher than the MFB value.

8. The non-transitory computer program product of claim 7 wherein monitor the communication channel further comprises:

issue periodic Modulation/Coding Scheme requests (MRQ) packets.

9. The non-transitory computer program product of claim 7 wherein the condition of the channel is based on at least one beamsteering matrix.

* * * * *